(12) United States Patent
Wei et al.

(10) Patent No.: US 6,304,426 B1
(45) Date of Patent: Oct. 16, 2001

(54) METHOD OF MAKING AN ULTRACAPACITOR ELECTRODE

(75) Inventors: Chang Wei, Niskayuna; Elihu Calvin Jerabek, Glenmont, both of NY (US); Katherine Dana DeJager, BJ Goes (NL); Oliver Harris LeBlanc, Jr., Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/162,528

(22) Filed: Sep. 29, 1998

(51) Int. Cl.$^7$ .................................................. H01G 9/155
(52) U.S. Cl. ............................................. 361/502; 361/505
(58) Field of Search ................................ 361/512, 500, 361/502–505, 522; 427/79

(56) References Cited

U.S. PATENT DOCUMENTS

| | | |
|---|---|---|
| 3,634,736 | 1/1972 | Boos et al. . |
| 3,648,126 * | 3/1972 | Boos et al. ............................ 361/502 |
| 4,542,444 | 9/1985 | Boland . |
| 4,638,407 * | 1/1987 | Lundsgaard .......................... 361/502 |
| 4,737,889 * | 4/1988 | Nishino et al. ....................... 361/502 |
| 4,803,597 | 2/1989 | Watanabe et al. .................... 361/502 |
| 4,862,328 * | 8/1989 | Morimoto et al. .................... 361/502 |
| 5,136,472 | 8/1992 | Tsuchiya et al. ..................... 361/502 |
| 5,150,283 | 9/1992 | Yoshida et al. ....................... 361/502 |
| 5,383,089 | 1/1995 | Williams et al. ..................... 361/502 |
| 5,391,433 | 2/1995 | Kawakubo et al. . |
| 5,420,747 | 5/1995 | Ivanov et al. ......................... 361/502 |
| 5,450,279 * | 9/1995 | Yoshida et al. ....................... 361/502 |
| 5,464,453 | 11/1995 | Tong et al. ........................... 29/25.03 |
| 5,624,497 * | 4/1997 | Tanaka et al. ........................ 118/411 |
| 5,682,288 * | 10/1997 | Wani ..................................... 361/502 |
| 5,723,232 | 3/1998 | Yamada et al. . |
| 5,726,856 | 3/1998 | King, Jr. et al. ..................... 361/505 |
| 5,746,782 | 5/1998 | Massucco et al. . |
| 5,905,629 * | 5/1999 | Alford .................................. 361/502 |
| 5,993,996 * | 11/1999 | Firsich ............................... 429/231.8 |
| 6,031,712 * | 2/2000 | Kurihara et al. ..................... 361/502 |

FOREIGN PATENT DOCUMENTS 11486    4/1996  (WO) .

OTHER PUBLICATIONS

"Mobility and Ionic Association of Lithium Salts in a Propylene Carbonate–Ethyl Methyl Carbonate Mixed Solvent", Ue & Mori, Electrochem. Soc., vol. 142, No. 8, Aug. 1995.

\* cited by examiner

Primary Examiner—Dean A. Reichard
Assistant Examiner—Eric W. Thomas
(74) Attorney, Agent, or Firm—Robert P. Santandrea; Noreen C. Johnson (57) ABSTRACT

A paste of organic solvent with dissolved organic salt and active carbon is formed and a uniform film of the paste is applied onto a substrate by casting the paste into a clearance between a knife blade and the substrate. The paste is evaporated to form a paste electrode for an ultracapacitor.

14 Claims, 4 Drawing Sheets

METHOD OF MAKING AN ULTRACAPACITOR ELECTRODE

This invention was made with government support under Contract No. 38-83CH10093 awarded by DOE. The government may have certain rights in the invention.

BACKGROUND OF THE INVENTION

Capacitors are storage devices that store electrical energy on an electrode surface. Electrochemical cells create an electrical charge at electrodes by chemical reaction. The ability to store or create electrical charge is a function of electrode surface area in both applications. Ultracapacitors, sometimes referred to as double layer capacitors, are a third type of storage device. An ultracapacitor creates and stores energy by microscopic charge separation at an electrical chemical interface between electrode and electrolyte.

Ultracapacitors are able to store more energy per weight than traditional capacitors and they typically deliver the energy at a higher power rating than many rechargeable batteries. Ultracapacitors comprise two porous electrodes that are isolated from electrical contact by a porous separator. The separator and the electrodes are impregnated with an electrolytic solution, which allows ionic current to flow between the electrodes while preventing electronic current from discharging the cell. Each electrode is in intimate contact with a current collector. One purpose of the current collector is to reduce ohmic loss. If the current collectors are nonporous, they can also be used as part of the capacitor case and seal.

When electric potential is applied to an ultracapacitor cell, ionic current flows due to the attraction of anions to the positive electrode and cations to the negative electrode. Upon reaching the electrode surface, the ionic charge accumulates to create a layer at the solid liquid interface region. This is accomplished by absorption of the charge species themselves and by realignment of dipoles of the solvent molecule. The absorbed charge is held in this region by opposite charges in the solid electrode to generate an electrode potential. This potential increases in a generally linear fashion with the quantity of charge species or ions stored on the electrode surfaces. During discharge, the electrode potential or voltage that exists across the ultracapacitor electrodes causes ionic current to flow as anions are discharged from the surface of the positive electrode and cations are discharged from the surface of the negative electrode while an electronic current flows through an external circuit between electrode current collectors.

In summary, the ultracapacitor stores energy by separation of positive and negative charges at the interface between electrode and electrolyte. An electrical double layer at this location consists of sorbed ions on the electrode as well as solvated ions. Proximity between the electrodes and solvated ions is limited by a separation sheath to create positive and negative charges separated by a distance which produces a true capacitance in the electrical sense.

During use, an ultracapacitor cell is discharged by connecting the electrical connectors to an electrical device such as a portable radio, an electric motor, light emitting diode or other electrical device. The ultracapacitor is not a primary cell but can be recharged. The process of charging and discharging may be repeated over and over. For example, after discharging an ultracapacitor by powering an electrical device, the ultracapacitor can be recharged by supplying potential to the connectors.

The physical processes involved in energy storage in an ultracapacitor are distinctly different from the electrochemical oxidation/reduction processes responsible for charge storage in batteries. Further unlike parallel plate capacitors, ultracapacitors store charge at an atomic level between electrode and electrolyte. The double layer charge storage mechanism of an ultracapacitor is highly efficient and can produce high specific capacitance, up to several hundred Farads per cubic centimeter.

A variety of metals, ceramics, carbons, and composites have been studied for use as electrodes for ultracapacitors. Carbon based electrodes are common and are widely used in commercially available devices. Carbon has a low atomic weight and carbon electrodes can be fabricated with very high surface areas. The present invention relates to an ultracapacitor cell that has a uniform porous carbon electrode and to a method of fabricating the electrode for use in a high performance double layer capacitor.

Numerous methods are known to make a carbon electrode. For example, an electrode can be fabricated by a forming process, by pressing electrode materials in a die or by slurry pasting with binders or screen printing carbon as a paste with a liquid phase binder/fluidizer. Both dry and wet electrode formations may include a binder such as polymers, starches, Teflon® particles or Teflon® dispersions in water.

Slurry pasting does not always produce a uniform and reproducible electrode. A nonuniform electrode results in a nonuniform voltage distribution, which adversely affects ultracapacitor operation. Further, the presence of electrochemically inert binders decreases ultracapacitor energy density. The present invention relates to a process for nonaqueous electrode fabrication using an organic diluent/electrolyte based knife pasting process. In the inventive process, liquid electrolyte functions as a binder to hold carbon particles together to eliminate the need for other binders. Further, the knife pasting process according to the invention results in improved reproducibility. The invention results in uniform electrodes to eliminate nonuniform voltage distribution. The present invention is advantageous in utilizing an organic diluent, preferably of a low boiling point, that can be easily evaporated to form uniform paste electrodes. Finally the invention provides low cost electrodes.

SUMMARY OF THE INVENTION

The invention relates to a method of producing a paste electrode of an ultracapacitor. A paste of organic solvents with dissolved organic salt and active carbon is formed and a uniform film of the paste is applied onto a substrate by casting the paste into a clearance between a knife blade and the substrate. Any volatile solvent is then evaporated to form the paste electrode.

In another aspect, the invention relates to a method of making an ultracapacitor. The method comprises providing a multilayer structure comprising two solid, nonporous current collectors, two porous electrodes separating the current collectors, a porous separator between the electrodes and an electrolyte occupying the pores in the electrodes and separator. At least one of the porous electrodes is a paste electrode produced by (i) forming a paste of organic solvents with dissolved organic salt and active carbon, (ii) applying a uniform film of the paste onto a substrate by casting the paste beneath the clearance between a knife blade and the substrate and (iii) evaporating any volatile solvent from the paste to form the paste electrode. The structure is sealed to form the ultracapacitor.

The invention also relates to a method of making a stack of ultracapacitor cells comprising providing in stacked relationship, a plurality of bipolar double layer ultracapacitor cells wherein at least one cell has at least one porous electrode comprising a uniform carbon paste coating on a substrate, the uniform coating varying less than about 1 mil in thickness on the substrate. A nonporous current collector is provided between each cell with each current collector having adjoining polarized electrodes of different cells bonded thereto. The electrodes and separators are saturated with electrolyte and the cells, current collectors and separators are sealed to form the stack of ultracapacitor cells.

In still another aspect of the invention, an ultracapacitor comprises at least one cell that comprises two solid, nonporous current collectors; two porous electrodes separating the current collectors, a porous separator between the electrodes and an electrolyte occupying the pores in the electrodes and separator. At least one of the electrodes comprises a uniform carbon paste coating on a substrate, the uniform coating varying less than about 1 mil in thickness on the substrate.

In one other aspect, the invention relates to a stack of cells wherein at least one electrode comprises a uniform carbon paste coating on a substrate, the uniform coating varying less than about 1 mil in thickness on the substrate.

DETAILED DESCRIPTION OF THE INVENTION

Figure 1:
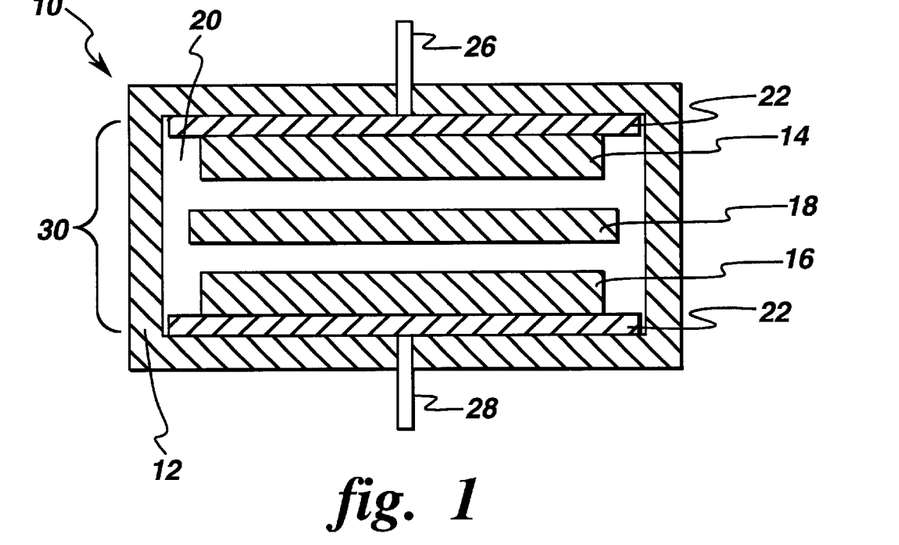
FIG. 1 is a front sectional view of an ultracapacitor.

Device 10 of FIG. 1 represents one, non-limiting example of an ultracapacitor which may utilize an electrode prepared according to the invention. In FIG. 1, the electrodes 14 and 16 are paste electrodes on an aluminum substrate. According to the first step of the inventive method, an organic solvent with dissolved electrolyte salt is mixed with active carbon to form a thick slurry. Preferably the organic solvent with dissolved electrolyte salt is the same as the electrolyte used in the resulting ultracapacitor 10. Exemplary organic solvents include but are not limited to nitriles such as acetonitrile, acrylonitrile and propionitrile; sulfoxides such as dimethyl, diethyl, ethyl methyl and benzylmethyl sulfoxide; amides such as dimethyl formamide and pyrrolidones such as N-methylpyrrolidone and carbonates such as propylene carbonate. Exemplary nonaqueous electrolytes are salts of organic and inorganic acids, ammonium and quaternary ammonium salts and the like. Preferably the organic solvent is the same as the electrolyte solvent of the ultracapacitor. Hence, the polar aprotic organic solvents listed hereinbelow as suitable electrolyte solvents are exemplary organic solvents for slurry forming. Similarly, the dissolved electrolyte salts in the ultracapacitor electrolyte are exemplary salts in the slurry forming electrolyte of the present invention. Electrolyte in the electrode structure serves three functions. The electrolyte serves as a promoter of ion conductivity, as a source of ions and as a binder for the carbon. Sufficient electrolyte should be used in the composition to achieve these functions. However, a separate binder can be used in addition to the electrolyte. In addition, additional organic solvents can be used to reduce the paste viscosity if desired to yield a more uniform electrode.

The carbon slurry is prepared by any known method. For example, the salt can be dissolved in the organic solvent in a ratio of salt to solvent of between about 0.1M and the saturation limit. Activated carbon in the form of a powder or fine particles is then mixed with the solvent to form a thick slurry. Additional solvents can be used to facilitate preparation of the slurry. The carbon powder or particles should be of a particular size range to prevent electrode to electrode contact in the instance of too large particles and to avoid penetration of the ultracapacitor separator in the case of too small particles. The average diameter of the carbon powder or particles should preferably range between about 0.1 to 100 microns, more preferably about 1 to 60 microns.

The carbon and solvent can be mixed by any conventional means, for example, by shaking the carbon in excess solvent with electrolyte for a period of time sufficient to allow complete absorption of solvent into the carbon. After the slurry is formed and the carbon and electrolyte well disbursed, excess solvent can be extracted by conventional means such as by vacuum or pressure filtration to provide a viscous paste. Excess solvent can also be removed by placing the slurry under a ram and applying a sufficient pressure to release excess solvent to impart desired consistency. Generally, the resulting carbon paste will have about 0.5 to about 8, preferably about 1 to about 4 and, most preferably about 1.5 to about 2.0 of electrolyte volumn/carbon weight ratio for use as an electrode. Preferably the paste is prepared by mixing a predetermined volume of solvent with carbon to avoid any additional solvent extraction step.

In the next step of the process, an organic diluent is added to the carbon and organic solvent/electrolyte paste to make it suitable for knife pasting. The boiling point of the diluent must be sufficiently low to permit easy evaporation from electrode matrix after formation. Additionally, the organic diluent must allow various low cost materials to be incorporated into the slurry. The use of the diluent to form the paste for knife pasting is a particular advantage of the present invention in permitting incorporation of low cost materials. For example, an electrode can be easily fabricated from the diluted carbon-organic solvent/electrolyte paste onto a cellulosic separator material. This is of particular advantage in the fabrication of stacks of cells with bipolar design. Suitable diluents include ketones, alcohols and nitrites. Acetone is a preferred diluent.

In the next step of electrode formation, the diluted slurry is pasted by a suitable knife method onto a substrate. The preferred knife pasting method utilizes a Gardner knife. The Gardner knife is an adjustable micrometer film applicator, which is a product of Paul N. Gardner Company, Inc., Pompano Beach, Fla. The Gardner knife permits casting uniform wet films by means of a knife blade that can be set to gate clearances between 1 and 250 mils. The Gardner knife includes two micrometer barrels for adjusting the gate clearances and an anodized aluminum knife blade frame with end sections that serve as paint wells. The end sections also serve as operator hand grips when drawing down wet films. The knife blade fits into slotted end sections that allow the blade to be adjusted vertically. A leaf spring is attached to a top plate of the applicator to maintain an upward blade pressure of the blade against two micrometer feet to retain the blade gate settings. Gate clearances can be adjusted from 0 to ¼" in increments of 1 mil with resolution to ½ mil.

Suitable substrates for pasting of the electrode include metal sheets, conducting polymer films, and separator materials. Preferably, the substrate is a conductor layer and more preferably is an aluminum conductor layer of the ultracapacitor.

Figure 2:
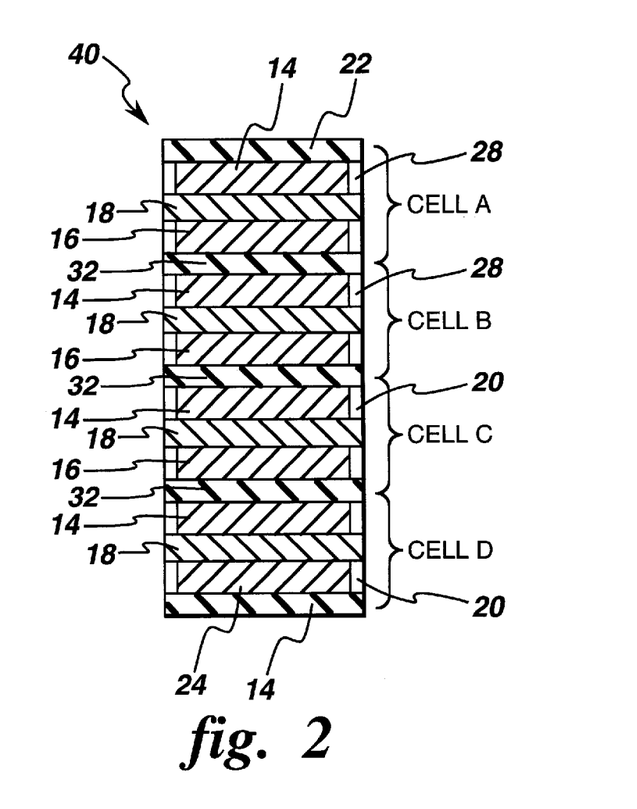
FIG. 2 is a front sectional view of a series stack of ultracapacitor cells.

The electrode of the invention can be used in a wide variety of ultracapacitors such as described in U.S. Pat. Nos. 5,464,453; 5,420,747; 5,150,283; 5,136,472; and 4,803,597; as well as PCT Application WO96/11486 (PCT/US95/12772; Apr. 18, 1996), all of which are incorporated herein by reference. FIGS. 1 and 2 herein, are based on PCT Application WO 96/11486 and show a non-limiting example of an ultracapacitor that can include the inventive electrode singly or in pairs. The example can include the electrode as cast on a collector plate or on a separator. At least one of the electrodes is uniformly coated according to the invention to vary less than about 1 mil in thickness.

In all of the Figures of this application, like structures are identified by the same numbers.

Referring to FIG. 1, ultracapacitor 10 includes a nonconductive enclosing body 12, a pair of carbon electrodes 14 and 16, an electronic porous separator layer 18, an electrolyte 20, a pair of conductive layers which are current collectors 22 and 24 and electrical leads 26 and 28, extending from the current collectors 22 and 24. One of the pair of current collectors 22 and 24 is attached to the back of each electrode 14 and 16. In FIG. 1, electrodes 14 and 16 can each represent a plurality of electrodes so long as the electrodes are porous to electrolyte flow.

The factors to be considered in choosing a current collector 22, 24 for an ultracapacitor include electrical conductivity, chemical stability to electrolyte and contaminants and low electrical resistance throughout the life of the device. A current collector has two components of resistance; a material electronic resistance and a contact resistance at the electrode interface. Since the contact resistance can be significantly larger than the material electronic resistance, treatments to reduce contact resistance or enlarge contact area between the current collector and electrode are important. Surface etching and other roughening procedures can be used to enlarge contact area. However, the permanence of a treated current collector is an issue in device longevity since the surface of a collector can become chemically transformed, as with an oxide or can react with electrode or electrolyte to form a barrier layer.

Current collectors commonly are made of aluminum because of its conductivity and cost. In the drawings, the current collectors 22 and 24 are thin layers of aluminum foil. However, the electrodes can be any suitable conductive material.

Again referring to FIG. 1, an electronic separator 18 is placed between the opposing carbon electrodes 14 and 16. The electronic separator 18 is preferably made from a highly porous material which acts as an electronic insulator between the carbon electrodes 14 and 16. The separator 18 assures that opposing electrodes 14 and 16 are never in contact with one another. Contact between electrodes could result in a short circuit and rapid depletion of the charges stored in the electrodes. The porous nature of the separator 18 allows movement of ions in the electrolyte 20. A wide variety of types and arrangements of separation layers can be employed, as those of ordinary skill in the electrochemical arts realize. Separation layers are usually made from nonconductive materials such as cellulosic materials; glass fiber; polymers such as polyesters or polyolefins; and the like. In those embodiments in which the separator layers will be in contact with sealant material, they should have a porosity sufficient to permit the passage of sealant and should be resistant to the chemical components in the sealant. In a typical ultracapacitor, the separator layers have a thickness in the range of about 0.5 mil to about 10 mils. Preferred separators 18 are porous polypropylene and tissue cellulosic materials.

Exemplary organic solvents for electrolyte 20 include but are not limited to nitriles such as acetonitrile, acrylonitrile and propionitrile; sulfoxides such as dimethyl, diethyl, ethyl methyl and benzylmethyl sulfoxide; amides such as dimethyl formamide and pyrrolidones such as N-methylpyrrolidone. Preferably, the electrolyte 20 includes a polar aprotic organic solvent such as a cyclic ester, chain carbonate, cyclic carbonate, chain ether and/or cyclic ether solvent and a salt. Preferred cyclic esters are esters having 3 to 8 carbon atoms. Examples of the cyclic esters include β-butyro-lactone, γ-butyrolactone, γ-valerolactone and δ-valerolactone. The chain carbonates are preferred to be carbonates having 3 to 8 carbon atoms. Examples of the chain carbonates include dimethyl carbonate, diethyl carbonate, dipropyl carbonate, methyl ethyl carbonate, methyl propyl carbonate and ethyl propyl carbonate. The preferred cyclic carbonates have 5 to 8 carbon atoms. Examples of the cyclic carbonates include 1,2-butylene carbonate, 2,3-butylene carbonate, 1,2-pentene carbonate, 2,3-pentene carbonate and propylene carbonate. The preferred chain ethers have 4 to 8 carbon atoms. Examples of the chain ethers include dimethoxyethane, diethoxyethane, methoxyethoxyethane, dibutoxyethane, dimethoxypropane, diethoxypropane and methoxyethoxypropnane. The preferred cyclic ethers have 3 to 8 carbon atoms. Examples of the cyclic ethers include tetrahydofuran, 2-methyl-tetrahydrofuran, 1,3-dioxolan, 1,2-dioxolan, 2-methyldioxolan and 4-methyl-dioxolan.

Suitable electrolyte salts include quaternary ammonium salts such as tetraethylammonium tetraflouroborate (($Et)_4NBF_4$), hexasubstituted guanidinium salts such as disclosed in U.S. Pat. No. 5,726,856, the disclosure of which is incorporated herein by reference, and lithium salts such as disclosed by Ue et al., Mobility and Ionic Association of Lithium Salts in a Propylene Carbonate-Ethyl Carbonate Mixed Solvent, *Electrochem. Soc.,* vol. 142, No. 8, August 1995, the disclosure of which is incorporated herein by reference.

In a preferred embodiment, the electrodes 14, 16 in FIG. 1, are both carbon electrodes cast onto the aluminum current collectors according to the present invention.

The enclosing body 12 can be any known enclosure means commonly used with ultracapacitors. It is an advantage to minimize the weight of the packaging means to maximize the energy density of the ultracapacitor. Packaged ultracapacitors are typically expected to weigh 1.25 to 2 times more than the unpackaged ultracapacitor. The electrical leads 26 and 28 extend from the current collectors 22 and 24 through the enclosing body 12 and are adapted for connection with an electrical circuit (not shown).

Ultracapacitor 10 of FIG. 1 includes a bipolar double layer cell 30 that includes two solid, nonporous current collectors 22, 24, two porous electrodes 14, 16 separating the current collectors 22, 24 and a porous separator 18 between the electrodes 14, 16 and an electrolyte 20 occupying pores in the electrodes 14, 16 and separator 18. Individual ultracapacitor cells can be stacked in series to increase operating voltage. The optimum design is to have adjacent cells separated with only a single current collector.

This collector is nonporous so that no electrolytic solution is shared between cells. This type of design is called bipolar and is illustrated in FIG. 2 the drawings. In a bipolar double layer capacitor, one side of the current collector contacts a positive electrode and the other side contacts a negative electrode of an adjacent cell. A series stack 40 of the high performance bipolar double layer cells 30 (A, B, C and D) is illustrated in FIG. 2. In FIG. 2, each pair of polarized carbon electrodes, 14, 16 is separated with a separator 18. A current collector 32 is attached at one surface to charged electrode 14 of a first cell. Attached to an opposite surface of the current collector 32, is an oppositely charged electrode 16 of a second cell. If one side of the current collector 32 is in contact with the negative electrode for a first capacitor cell "A," then the other side of the same current collector 32 is in contact with a positive electrode for an adjacent cell "B." A sufficient amount of an electrolyte 20 is introduced such that the electrolyte 20 saturates the electrodes 14 and 16 and separator 18 within each cell. Exterior current collectors 22 and 24 are placed at each end of the stack.

The internal current collectors 32 of the series stack of cells are preferably nonporous layers of aluminum foil designed to separate the electrolyte 20 between adjacent cells. The exterior current collectors are also nonporous such that they can be used as part of the external capacitor case seal, if necessary. The electronic separator 18 is located between the opposing carbon electrodes 14 and 16 within a particular capacitor cell. The electronic separator 18 allows ionic conduction via charged ions in the electrolyte.

The ultracapacitor cell can be constructed by placing the layers of conductor, electrode and separator along with electrolyte within an enclosing body. The structure can then be subjected to pressure to seal the layers within the enclosing body. Alternatively, the enclosing body can be subjected to pressure and vacuum. The vacuum acts to remove gases while the ultracapacitor is sealed. Alternatively, the ultracapacitor cell can be constructed by providing adhesive between layers and applying pressure and or heat throughout the adhesive to seal the cell.

Figure 3:
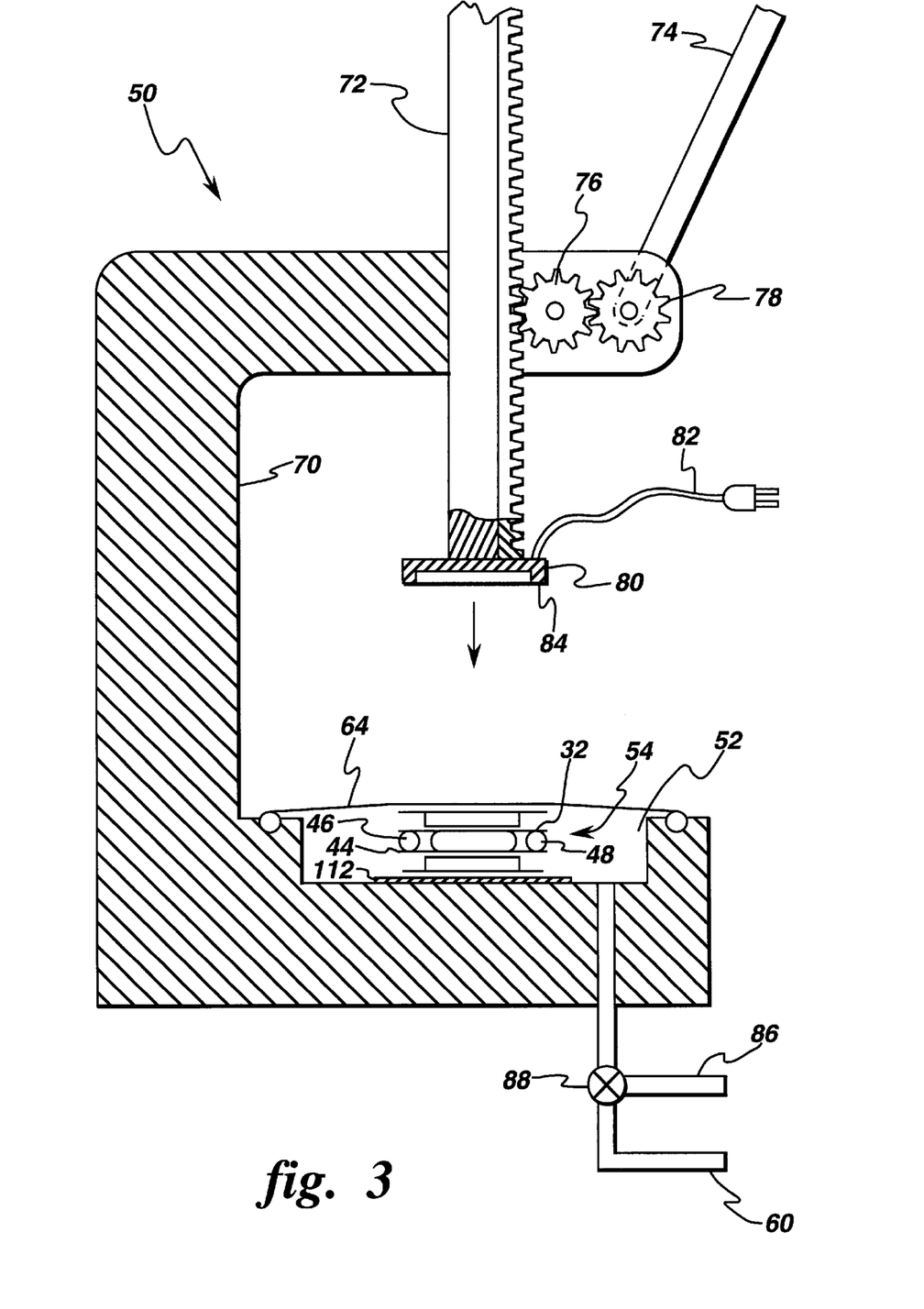
FIG. 3 is a cross-sectional view of an exemplary apparatus for sealing an ultracapacitor.

FIG. 3 depicts one, non-limiting illustration of an apparatus and method of sealing an ultracapacitor or series stack of ultracapacitor cells according to the present invention. Referring to FIG. 3, structure 50 is a frame, platform, or other construction but is often a press as described below. An enclosable region is depicted in FIG. 3 as recess 52, in which an ultracapacitor series stack 40 is disposed. The embodiment illustrated in FIG. 3 permits application of vacuum while the ultracapacitor is being sealed. Primary vacuum tube 60 communicates with recess 52. A collapsible membrane 64 can be fastened over the ultracapacitor to maintain a vacuum while the cell is being sealed by pressing.

Figure 4:
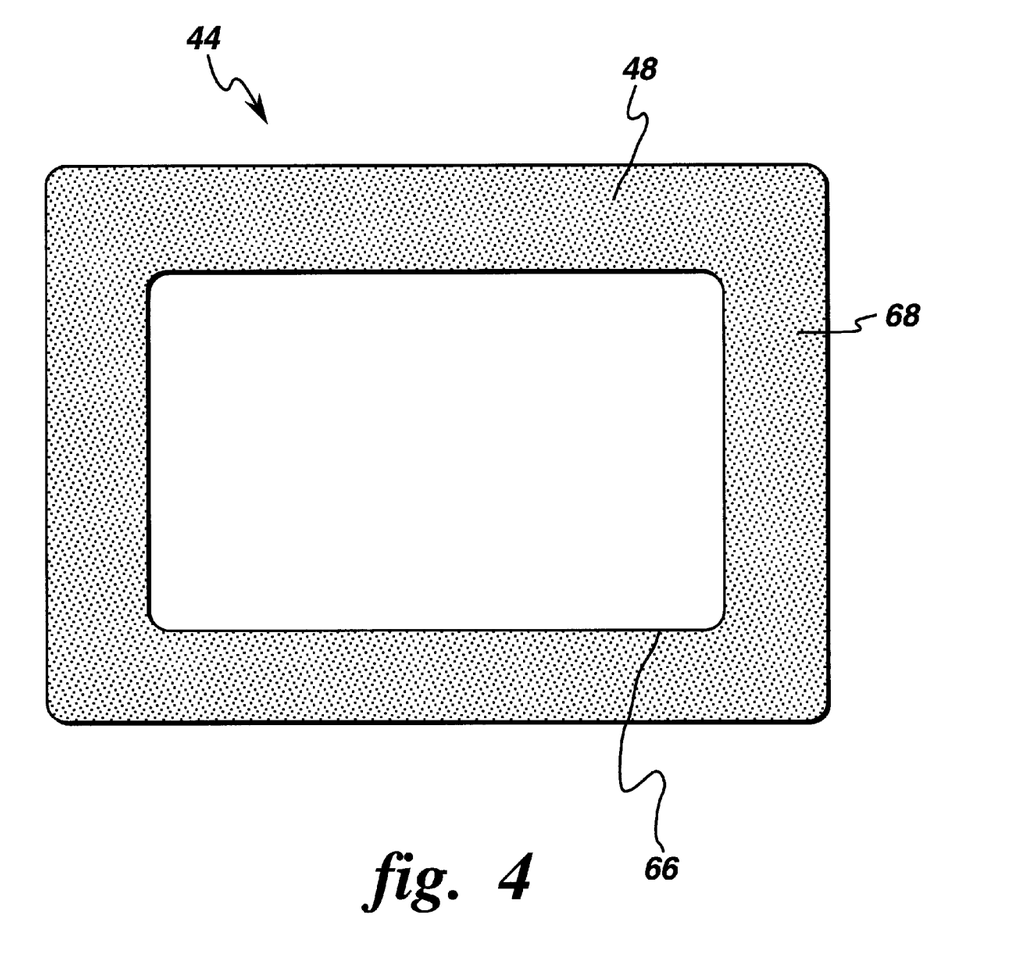
FIG. 4 is a top cross-sectional view of a separator of a sealed ultracapacitor.

FIG. 3 shows an ultracapacitor cell disposed in the recess area of the press 50. The cell includes a separator system, comprising an upper separator layer 42 and a lower separator layer 44. Sealant portions 46 and 48 are disposed in a peripheral area between the bottom surface of separator 42 and the top surface of separator 44. "Peripheral" refers to the boundary area of the separator layers. In general, this area should be as small as possible. This boundary area is designated as element 68 in FIG. 4. FIG. 4 provides a top, cross-sectional view of a separator layer similar to layer 44 of FIG. 3, after sealant has spread to some extent by the action of pressure and, optionally, heat, as described below. The boundary area 68 surrounds the primary section 66 of a separator layer.

Many different types of sealants can be used in the present invention and the term is meant to encompass, "glues", or "pastes." Sealants are described, for example, in the Kirk-Othmer *Encyclopedia of Chemical Technology*, 3rd Edition, Vol.1, pp.488–508 (1978), and in The Condensed Chemical Dictionary, 10th Edition, 1981, Van Nostrand Reinhold Company. In general, the selected sealant should be chemically resistant to electrolyte. It should also be capable of withstanding operating temperatures of the ultracapacitor without substantial degradation. Moreover in those embodiments where the sealant contacts the separators, it should be capable of flowing through the thickness of the separator layers. Once cured, the sealant should be substantially impermeable to the flow or passage of electrolyte.

Heat-curable sealants may be used in some embodiments. Moisture-cured sealants or externally-cured materials may be used. Other embodiments may use air-curable or pressure-sensitive sealants, such as "hot melt" glues. Illustrative sealants include those based on acrylic, ethylene such as ethylene vinyl acetate (EVA) copolymer, silicone, rubber, epoxy materials, or combinations of these materials. Commercial examples include the materials commonly referred to as "hot glues."

The sealants are usually in the form of liquids, pastes, or solids. A sealant may be applied to one or both of the facing surfaces of the separators or other surfaces. Many techniques are available for applying sealant. Known application techniques include the use of a spatula, brush, roller, spray, or glue gun. As one example, a bead, strip or "ring" of sealant is applied along the peripheral area 68 of one of the separator layers. Alternatively, individual droplets of sealant can be deposited at sites in the peripheral area 68 with the droplets flowing and covering the peripheral area 68 upon the application of pressure, vacuum and/or heat. As yet another alternative, at least one of the separator layers 18 can be pre-impregnated with sealant. All of these techniques cause the sealant to form a continuous layer. In general, the particular method of deposition is not critical, as long as the sealant is applied to locations where it will eventually form a seal after pressure or vacuum is released. The ultracapacitor becomes sealed by a barrier which is perpendicular to the horizontal capacitor layers which are encased in the barrier.

A compressive force is applied to promote the flow of the sealant—especially in the case of sealant compositions with very high softening points or glass transition temperatures, such as the EVA based types. Compression can be applied indirectly to the sealant through upper ultracapacitor layers by means of the mechanical press 50 of FIG. 3. Other devices to seal an ultracapacitor include an hydraulic press or pneumatic press or any device for applying compressive force. The press 50 of FIG. 3 includes structural frame 70 and adjustable beam 72. The length of beam 72 moves in a direction perpendicular to the base portion of the structural frame as controlled by the selective action of hand lever 74 and gears 76 and 78. Compression element 80 is detachably attached as the base of beam 72. Bottom surface 82 can be similar in shape to the peripheral area of the top planar surface of ultracapacitor 40. The force applied by the press should be sufficient to cause the sealant to become substantially fluid, to flow and form a continuous bead or strip around the peripheral area of the layer on which it is deposited. Thus, the particular press force depends in large part on the nature of the sealant. In general, the pressure will be in the range of about 1 psi to about 1,000 psi and preferably, in the range of about 10 psi to about 100 psi. A lower press force will be suitable for lower viscosity sealants and a higher press force will be required for higher viscosity materials.

The sealant can be heated while being compressed. Heating enhances the flow characteristics of the sealant. Heating temperature should be sufficient to soften the sealant. Preferably, the temperature is high enough to melt the sealant. For a sealant made from an EVA based material, a suitable temperature will be in the range of about 100° C. to about 300° C.

Heat is applied to the sealant in the press 50 of FIG. 3 by means of a standard electrical heating element that is encased within element 80 and is connected to an electrical outlet by way of cord 82. The bottom surface 84 of element 80 has a shape that aligns with sealant-containing peripheral regions of ultracapacitor 10. Thus, when compression element 80 is lowered for compression of the ultracapacitor through membrane 64, heat is transmitted primarily to the sealant containing regions.

A vacuum can be applied to press together the layers of the ultracapacitor and to evacuate ambient gasses from the internal region of the cell structure. In FIG. 3, vacuum tube 60 is connected to a vacuum source through vacuum valve 88 with backfill vacuum tube 86. When vacuum is applied, the collapsible membrane 64 is positioned over recess 52. The membrane 64 maintains the vacuum within the recess and transmits the applied compressive force to the layers of the ultracapacitor. The membrane 64 is heat-resistant to a temperature of about 400° C. The amount of vacuum applied ranges from about 700 mm mercury to 0.1 mm mercury. A typical vacuum pressure is in the range of about 500 mm mercury to about 0.1 mm mercury.

In operation, the applied vacuum pressure draws collapsible membrane 64 tightly against the top of ultracapacitor 10, compressing the individual layers of the ultracapacitor against platform layer 58 while the action of compression element 80 presses against sealant-containing regions to induce sealant 46, 48 to permeate the peripheral regions of separator layers 18. The sealant contacts substantially aligned peripheral areas 60 of the facing surfaces of conductive layers 22 and 24. As the sealant cures or solidifies, it forms a strong bond to join layers 22 and 24. After sealing is complete, compression element 80 is retracted and the ultracapacitor is allowed to cool.

The following examples are illustrative of the invention.

EXAMPLE 1

In this example, acetone was used as an organic diluent and propylene carbonate/tetraethylammonium tetrafluoroborate served as electrolyte. A carbon composition of 2% carbon black and 98% activated carbon was used as the electrode active material. A slurry used for Gardner knife pasting was made by mixing electrolyte, diluent and active carbon materials in a ratio of 2 ml electrolyte: 5 ml acetone: 1 g carbon materials (0.98 g activated carbon plus 0.02 g carbon black). The carbon paste electrode was fabricated by spreading paste with a Gardner knife onto conductive Kapton® (a carbon filled polyimide 90XC275 from DuPont, Wilmington, Del.) film held on a flat surface. The thickness of electrode application was varied by adjusting the Gardner knife height to apply a 16 mil film. The acetone was evaporated from the paste immediately after application to the substrate. The resulting electrodes were uniform, reproducible and easily handled and contained only carbon, electrolyte and the substrate.

EXAMPLE 2

Six electrodes were fabricated by the procedure of Example 1 and four thickness measurements, A, B, C and D, were taken of each electrode at spaced intervals. The thickness measurements for the six samples are shown in the following Table I.

TABLE 1

|    | A   | B   | C   | D   |
|----|-----|-----|-----|-----|
| 1. | 9.0 | 9.0 | 9.4 | 9.4 |
| 2. | 9.8 | 9.5 | 9.5 | 9.6 |
| 3. | 9.2 | 8.9 | 8.8 | 9.0 |
| 4. | 9.4 | 9.4 | 9.7 | 9.7 |
| 5. | 9.5 | 9.4 | 9.7 | 9.7 |
| 6. | 9.3 | 9.2 | 9.5 | 9.4 |

Thickness variation for each electrode was less than 5%.

The six electrodes were then used to fabricate single ultracapacitor cells, each having two electrodes. Capacitance for each ultracapacitor cell was measured by a symmetrical cyclic voltammetry technique. Current through the cell was observed while the voltage across the two electrodes was swept from a lower negative limit $(-V_t)$ to a positive upper limit $(+V_t)$ of equal magnitude at a constant voltage sweep rate (S). The voltage sweep rate was then reversed to $-S$ and the voltage swept back to the lower limit $(-V_t)$. The cycles were repeated until observed current waveform was reproducible from one cycle to the next.

Figure 5:
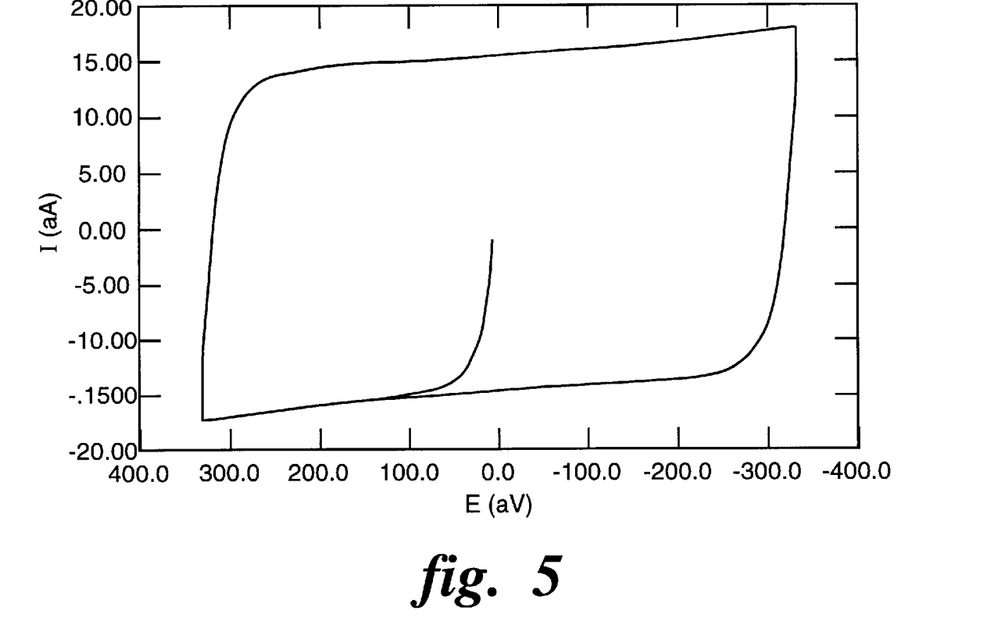
FIG. 5 shows current-potential curves for an ultracapacitor.

A typical result with a lower limit of $-350$ mV and an upper limit of 350 mV is shown in FIG. 5. In this case, the geometric area of each electrode was 4 in$^2$ and scan rate was 2 mV/sec. The observed current waveform was interpreted by modeling the ultracapacitor as a series RC circuit in which a capacitance C is connected in series with a resistance R, assuming negligible leakage. Here R was considered the total resistive contribution from electrolyte and electrode structure. In practice, R is never truly zero in the series RC circuit. Thus current changes at the voltage limits are not instantaneous but occur exponentially in time. If sweeprate is chosen small enough, the current waveform approaches a square wave as shown in FIG. 5.

This example demonstrates that good ultracapacitor cells can be fabricated using the method of the invention.

EXAMPLE 3

In this example, acetone was used as an organic diluent and propylene carbonate/tetraethylammonium tetrafluoroborate served as electrolyte. A carbon composition of 2% carbon black and 98% activated carbon was used as the electrode active material. A slurry used for Gardner knife pasting was made by mixing electrolyte, diluent and active carbon materials in a ratio of 2 ml electrolyte: 5 ml acetone: 1 g carbon materials (0.98 g activated carbon plus 0.02 g carbon black). 2-mil Kimwipes® (Kimberly-Clark Corporation, Roswell, Ga.) sheets were pre-wet with electrolyte and placed on a flat surface and were spread with paste via the Gardner knife. A coated Kimwipes® sheet was then pressed against each flat side of a 3"×3"conductive Kaptone® (carbon filled polyimide from DuPont, Wilmington, Del.) sheet to form a bipolar electrode. The electrodes were stacked in series of six cells with each series having two end electrodes coated only on interior sides. Each stack of cells was held in a clamp and sealed with RTV 162 (General Electric Company, Waterford, N.Y.) sealant.

Figure 6:
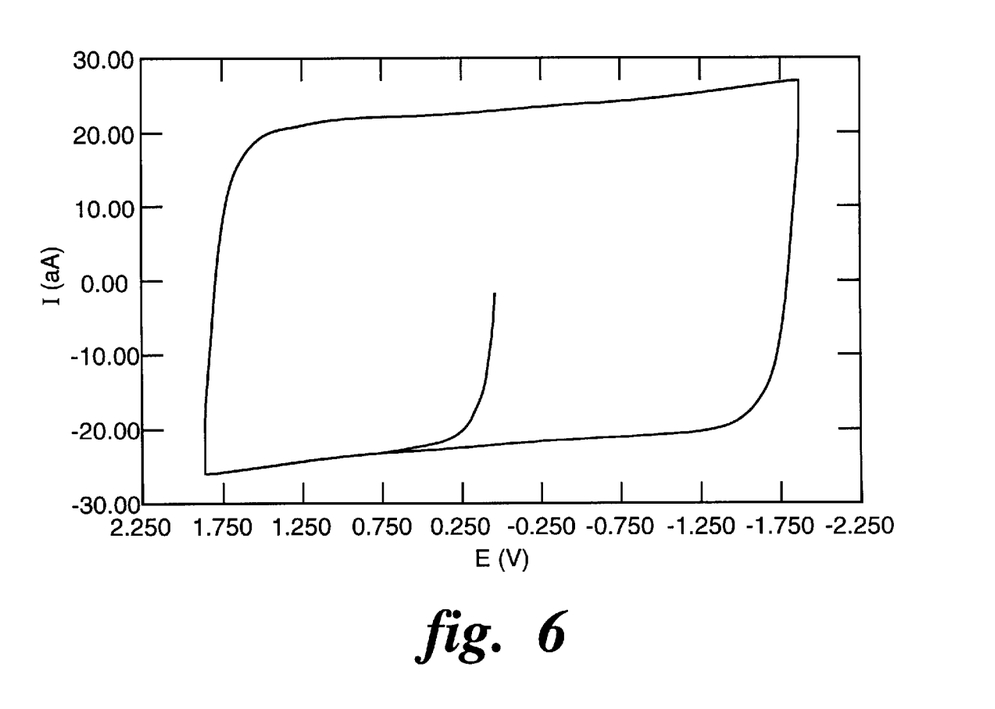
FIG. 6 shows current-potential curves for a series stack of ultracapacitor cells.

Symmetrical cyclic voltammetry was employed to characterize the performance of the stacks of cells. Current through a stack was observed while voltage across the two electrodes was swept from a lower negative limit $(-V_t)$ to a positive upper limit $(+V_t)$ of equal magnitude at a constant voltage sweep rate (S). The voltage sweep rate was then reversed to −S and the voltage swept back to the lower limit (−V$_r$). The cycles were repeated until observed current waveform was reproducible from one cycle to the next. A typical result with a lower limit of −2.0V and an upper limit of 2.0V is shown in FIG. 6. In this case, the geometric area of each electrode was 7.6 in$^2$ and the scan rate was 2 mV/sec. Again the observed current waveform can be interpreted by modeling the ultracapacitor as a series RC circuit in which a capacitance C is connected in series with a resistance R, assuming negligible leakage. In this procedure, the current waveform for each stack approached a square wave as shown in FIG. 6.

This example demonstrated that a stack of ultracapacitor cells can be fabricated according to the method of the invention.

What is claimed:

1. A paste electrode of an ultracapacitor, comprising a uniform carbon paste coating on a substrate, said uniform coating varying less than about 1 mil in thickness on said substrate produced by a method comprising:
   (i) forming a paste of organic solvent with dissolved organic salt and active carbon, (ii) applying a uniform film of said paste onto a substrate by casting said paste into a clearance between a knife blade and said substrate and (iii) evaporating solvent from said paste to form said paste electrode.

2. The paste electrode of claim 1, said uniform coating varying less than about ½ mil in thickness on said substrate.

3. An ultracapacitor comprising at least one cell, said cell comprising; two solid, nonporous current collectors, two porous electrodes separating said current collectors, a porous separator between said electrodes and an electrolyte occupying pores in said electrodes and separator, wherein at least one of said electrodes comprises a paste electrode according to claim 1.

4. The ultracapacitor of claim 3, wherein said current collectors comprise aluminum.

5. A stack of ultracapacitor cells, comprising at least one of the cells of claim 4.

6. The ultracapacitor of claim 3, wherein said separator is polypropylene or cellulosic tissue material.

7. A stack of ultracapacitor cells, comprising at least one of the cells of claim 6.

8. The ultracapacitor of claim 3, wherein said electrolyte comprises a polar aprotic organic solvent and a quaternary ammonium salt, a hexasubstituted quanidium salt or a lithium salt.

9. A stack of ultracapacitor cells, comprising at least one of the cells of claim 8.

10. The ultracapacitor of claim 3, wherein said electrolyte comprises butyrolactone and tetraethylammonium tetraflouroborate.

11. A stack of ultracapacitor cells, comprising at least one of the cells of claim 10.

12. The ultracapacitor of claim 3, comprising a plurality of electrodes separating said current collectors.

13. A stack of ultracapacitor cells, comprising at least one of the cells of claim 12.

14. A stack of ultracapacitor cells, comprising at least one of the cells of claim 3.

* * * * *